(12) United States Patent
Nakane et al.

(10) Patent No.: US 11,849,855 B2
(45) Date of Patent: Dec. 26, 2023

(54) SEAT DEVICE

(71) Applicant: KOITO ELECTRIC INDUSTRIES, LTD., Shizuoka (JP)

(72) Inventors: Masanobu Nakane, Shizuoka (JP); Yutaka Nagao, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 0 days.

(21) Appl. No.: 17/785,957

(22) PCT Filed: Sep. 16, 2020

(86) PCT No.: PCT/JP2020/035111
§ 371 (c)(1),
(2) Date: Jun. 16, 2022

(87) PCT Pub. No.: WO2021/131180
PCT Pub. Date: Jul. 1, 2021

(65) Prior Publication Data
US 2023/0015167 A1    Jan. 19, 2023

(30) Foreign Application Priority Data

Dec. 27, 2019  (JP) .................................. 2019-239066

(51) Int. Cl.
*A47C 3/18* (2006.01)
(52) U.S. Cl.
CPC ...................................... *A47C 3/18* (2013.01)
(58) Field of Classification Search
CPC ................ A47C 3/18; B60N 2002/022; B60N 2002/0212; B60N 2/0742; B60N 2/3068
See application file for complete search history.

(56) References Cited

U.S. PATENT DOCUMENTS 2,148,187 A * 2/1939 Burnham ........... B61D 33/0085
248/425
2,472,349 A * 6/1949 Smith .................... B61D 33/00
248/425
(Continued)

FOREIGN PATENT DOCUMENTS

JP    S42-10568 B1    6/1967
JP    H06-36949 U1    5/1994
(Continued)

OTHER PUBLICATIONS

International Search Report for PCT/JP2020/035111 dated Nov. 24, 2020 by ISA/JPO.

*Primary Examiner* — Philip F Gabler
(74) *Attorney, Agent, or Firm* — Kubotera & Associates, LLC

(57) ABSTRACT

A seat device that can easily and positively achieve the conversion of the state of a seat. A leg stand (11) fixed on a floor surface, a movable stand (20) supported by the leg stand (11) so as to be able to advance/retract in front and back directions, an underframe (30) of the seat supported by the movable stand (20) so as to be rotatable in forward and backward directions, and an interlocking mechanism (50) that interlocks advancement/retraction of the movable stand (20) with rotation of the underframe (30) are included. The interlocking mechanism (50) includes a plurality of cam grooves (51) that are provided to the leg stand (11), and regulates the trajectory of rotation or advancement/retraction of the underframe (30), a rotary member (52) that is provided to the underframe (30), and is engaged with the cam grooves (51) so as to be movable along the cam grooves (51), the engagement being always maintained to at least any portion of the cam grooves (51), and a switching portion (53) that is provided at a branch point in the cam grooves (Continued)

(51), and can switch the direction to which the rotary member (52) is guided at the branch point.

6 Claims, 14 Drawing Sheets

(56) References Cited

U.S. PATENT DOCUMENTS

| | | | |
|---|---|---|---|
| 4,417,715 A | 11/1983 | Edwards | |
| 6,027,170 A * | 2/2000 | Benz | B60N 2/14 297/344.21 |
| 6,241,314 B1 * | 6/2001 | Pufall | B60N 2/2821 297/256.16 |
| 6,302,483 B1 * | 10/2001 | Ricaud | B61D 33/0085 297/344.22 |
| 6,938,954 B1 * | 9/2005 | Hendren | B60N 2/2863 297/256.16 |
| 7,472,958 B2 * | 1/2009 | Sano | B60N 2/146 297/344.21 |
| 7,753,444 B2 * | 7/2010 | Vallentin | B60N 2/2863 297/344.21 |
| 9,718,378 B2 * | 8/2017 | Schulz | B60N 2/07 |
| 2019/0241097 A1 | 8/2019 | Kaneko | |

FOREIGN PATENT DOCUMENTS

| | | |
|---|---|---|
| JP | H10-16773 A | 1/1998 |
| JP | 2017-94958 A | 6/2017 |
| JP | 2018-016217 A | 2/2018 |

* cited by examiner

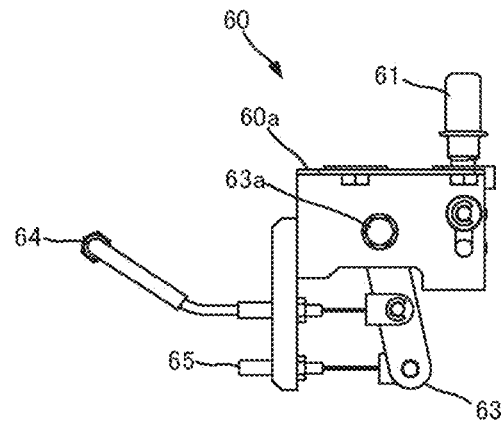
FIG. 7
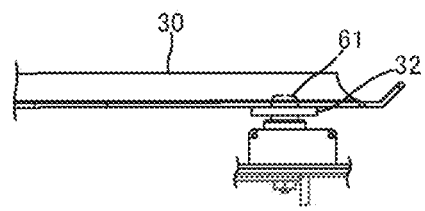 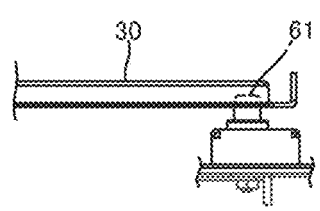
FIG. 8 (a)    FIG. 8 (b)

FIG. 10 (a) rotation angle : 0°
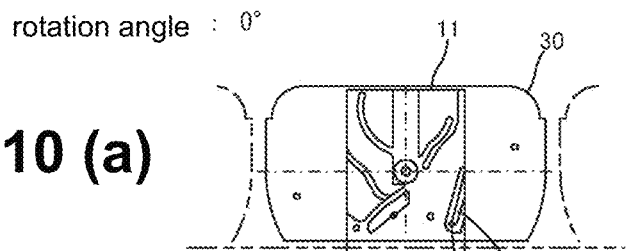
FIG. 10 (b) rotation angle : 2°
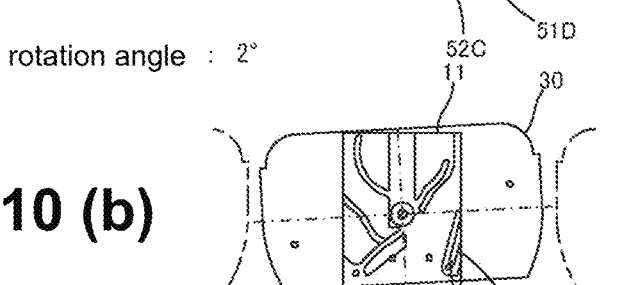
FIG. 10 (c) rotation angle : 5°
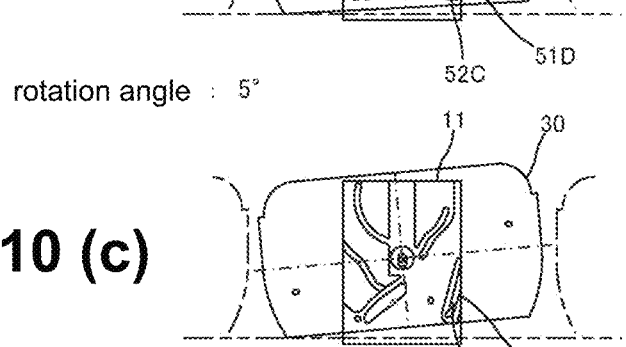
FIG. 10 (d) rotation angle : 10°
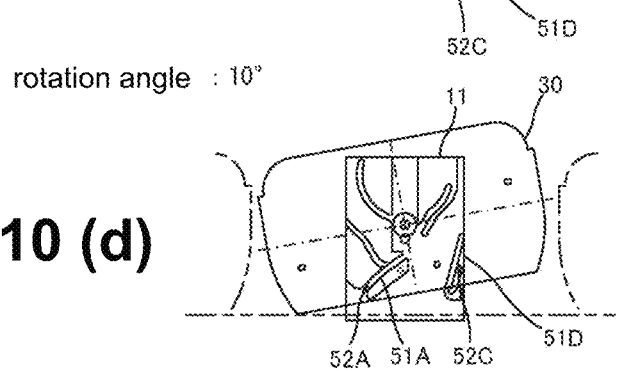
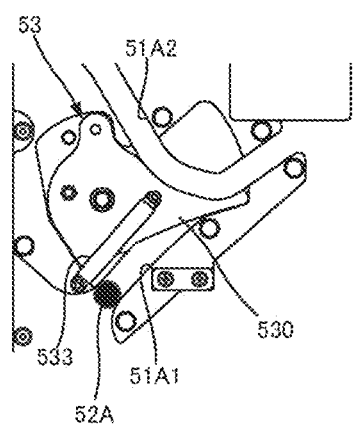
FIG. 10 (e) rotation angle : 20°
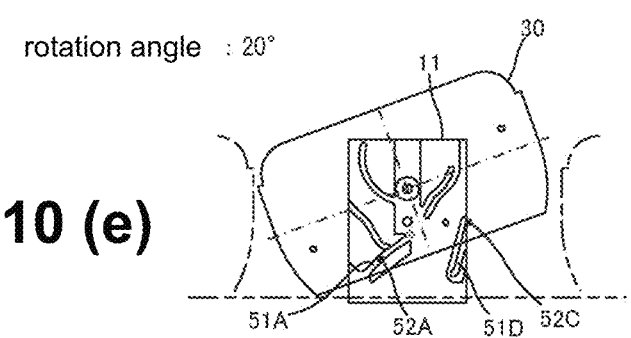

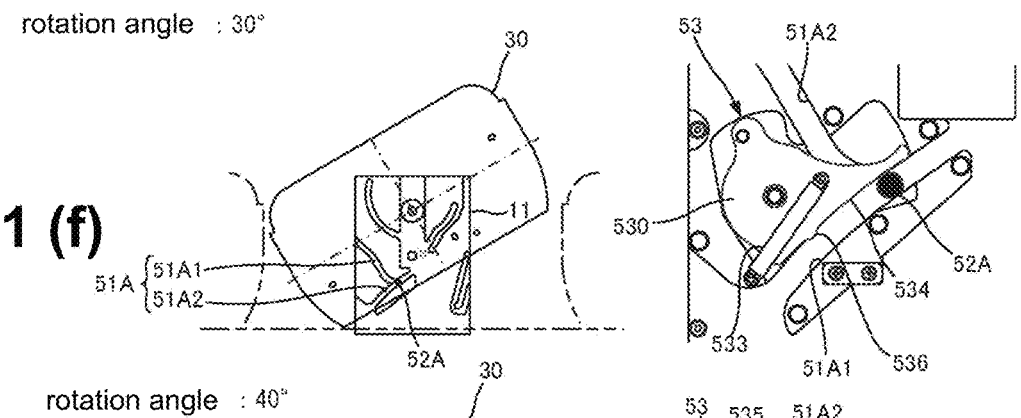
FIG. 11 (f) rotation angle : 30°
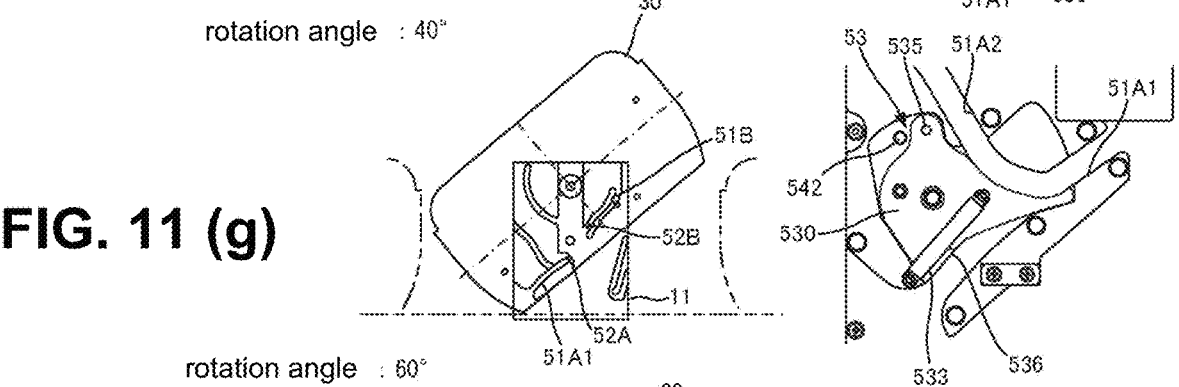
FIG. 11 (g) rotation angle : 40°
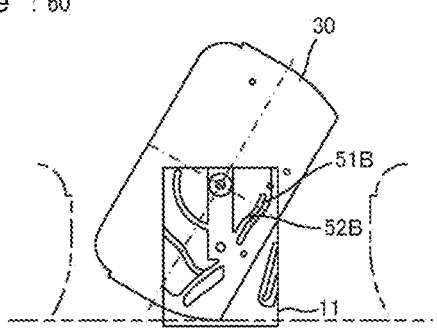
FIG. 11 (h) rotation angle : 60°
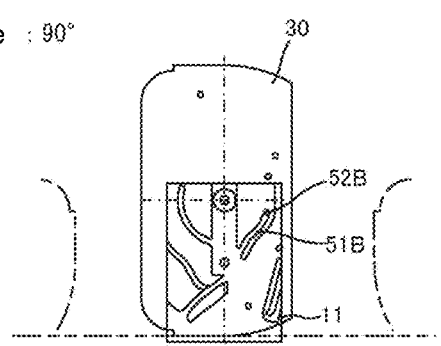
FIG. 11 (i) rotation angle : 90°

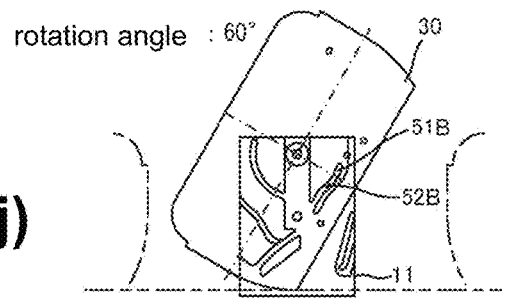
FIG. 12 (j)
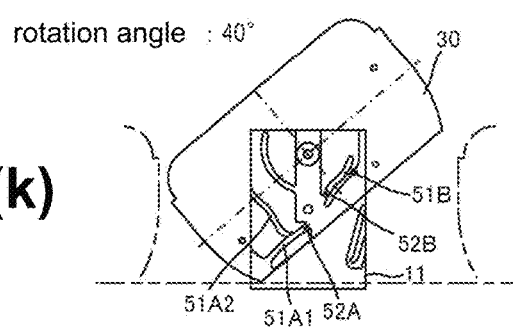 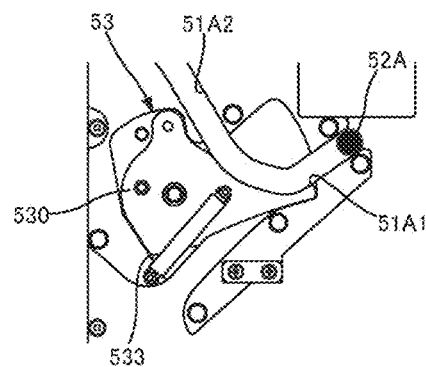
FIG. 12 (k)
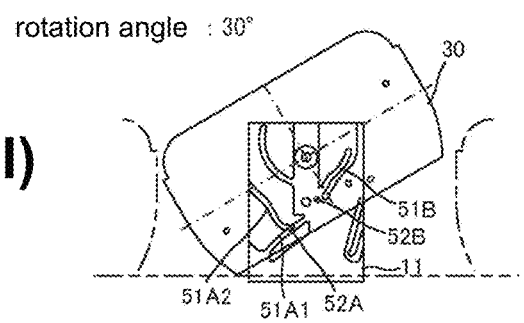
FIG. 12 (l)
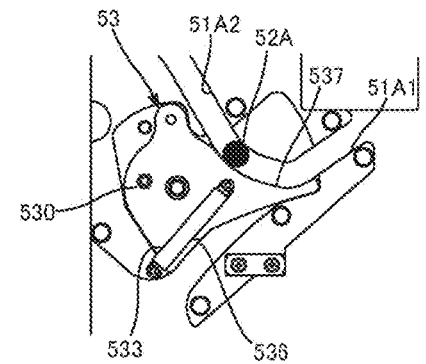
FIG. 12 (m)
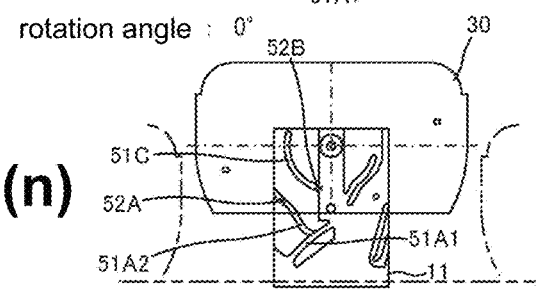
FIG. 12 (n)

SEAT DEVICE

TECHNICAL FIELD

The present invention relates to a seat device that is convertible in the state of a seat, such as the orientation.

BACKGROUND ART

Conventionally, many seats mounted in, for example, railroad cars are of a stool type, which are long in both directions and can seat a plurality of persons, and are generally installed along walls in cabins. As for such a seat, a rotary seat is known that can be rotated about a rotation axis in the center of the seat to convert the orientation between a long state where the back of the seat is parallel to and along a wall, and a cross state where the back of the seat is orthogonal to the wall.

As for such a rotary seat, the present applicant has already proposed a seat device that includes an interlocking mechanism for interlocking the rotation and advancement of a seat, so that the trajectories (turning radii) of the corners of the seat do not interfere with a wall, when rotating the seat from the long state along the wall to the cross state. Refer to Patent Literature 1.

The interlocking mechanism regulates a part of the trajectory of the rotation or advancement/retraction of the seat by the engagement relationship between a guide rail on a leg stand side, and a roller on a seat side. Additionally, the seat device includes a lock pin capable of protruding from a fixed side toward the seat side, and can be rotated from one cross state to a 180 degree reverse cross state, with the advancement/retraction of the seat being restrained by the lock pin.

CITATION LIST

Patent Literature

Patent Literature 1: Japanese Patent Laid-Open No. 2018-016217

SUMMARY OF THE INVENTION

However, in the seat device including the conventional interlocking mechanism, it is only the lock pin that restrains the advancement/retraction of the seat at the time of rotation of the seat in a state where the guide rail and the roller, which form the interlocking mechanism, are not engaged. Therefore, when the lock pin is disengaged, there is a possibility that the seat freely moves and derails from an original trajectory. As the countermeasure, for example, when the guide rail is disposed on all the trajectories of the seat, the configuration of the interlocking mechanism not only becomes bulky, but also becomes complicated and leads to higher costs.

The present invention has been made by focusing on the problems of the prior art as described above, and an object of the present invention is to provide a seat device that can easily and positively achieve the conversion of the state of a seat.

In order to achieve the aforementioned object, in one aspect of the present invention,
a seat device that is convertible in a state of a seat comprises
a base fixed on a floor surface,
a slider supported by the base so as to be able to advance/retract in front and back directions,
the seat supported by the slider so as to be rotatable in forward and backward directions, and
an interlocking mechanism that interlocks advancement/retraction of the slider with rotation of the seat,
the interlocking mechanism including
a cam path that is provided to one of the base and the seat, and regulates a trajectory of rotation or advancement/retraction of the seat,
an engagement portion that is provided to the other of the base and the seat, and is engaged with the cam path so as to be movable along the cam path, engagement with at least any portion of the cam path being always maintained, and
a switching portion that is provided at a branch point in the cam path, and can switch a direction to which the engagement portion is guided at the branch point.

With the seat device according to the present invention, the conversion of the state of a seat can be easily and positively achieved.

BRIEF DESCRIPTION OF THE DRAWINGS

FIG. 7 is a front view showing a lock pin and its drive mechanism of a rotation lock mechanism of the seat device according to the embodiment.

FIG. 8 is a front view showing locking holes of the rotation lock mechanism of the seat device according to the embodiment: (a) the locking hole on one long side of an underframe; and (b) the locking hole in both short sides of the underframe.

FIG. 10 is an explanatory diagram showing operations of a first-half process at the time of converting the seat from the long state to the cross state in the interlocking mechanism of the seat device according to the embodiment.

FIG. 11 is an explanatory diagram showing operations of a latter-half process at the time of converting the seat from the long state to the cross state in the interlocking mechanism of the seat device according to the embodiment.

FIG. 12 is an explanatory diagram showing operations of a first-half process at the time of converting the seat from the cross state to the reverse cross state in the interlocking mechanism of the seat device according to the embodiment.

DETAILED DESCRIPTION OF PREFERRED EMBODIMENTS

Hereinafter, an embodiment representing the present invention will be described based on the drawings.

FIG. 1 to FIG. 13 show one embodiment of the present invention.

A seat device 10 according to the present embodiment is convertible in the state including the orientation of a seat. Here, although the application of the seat is not particularly limited, a case will be described below as an example where the seat is applied to a stool for two persons mounted in a cabin of a railroad car. Note that, in each figure, a slight difference in the shape of an identical part is merely a design change (for example, the difference in the shape of an underframe 30 in FIG. 1 and FIG. 10, etc.).

<Outline of Seat Device 10>

Figure 1:
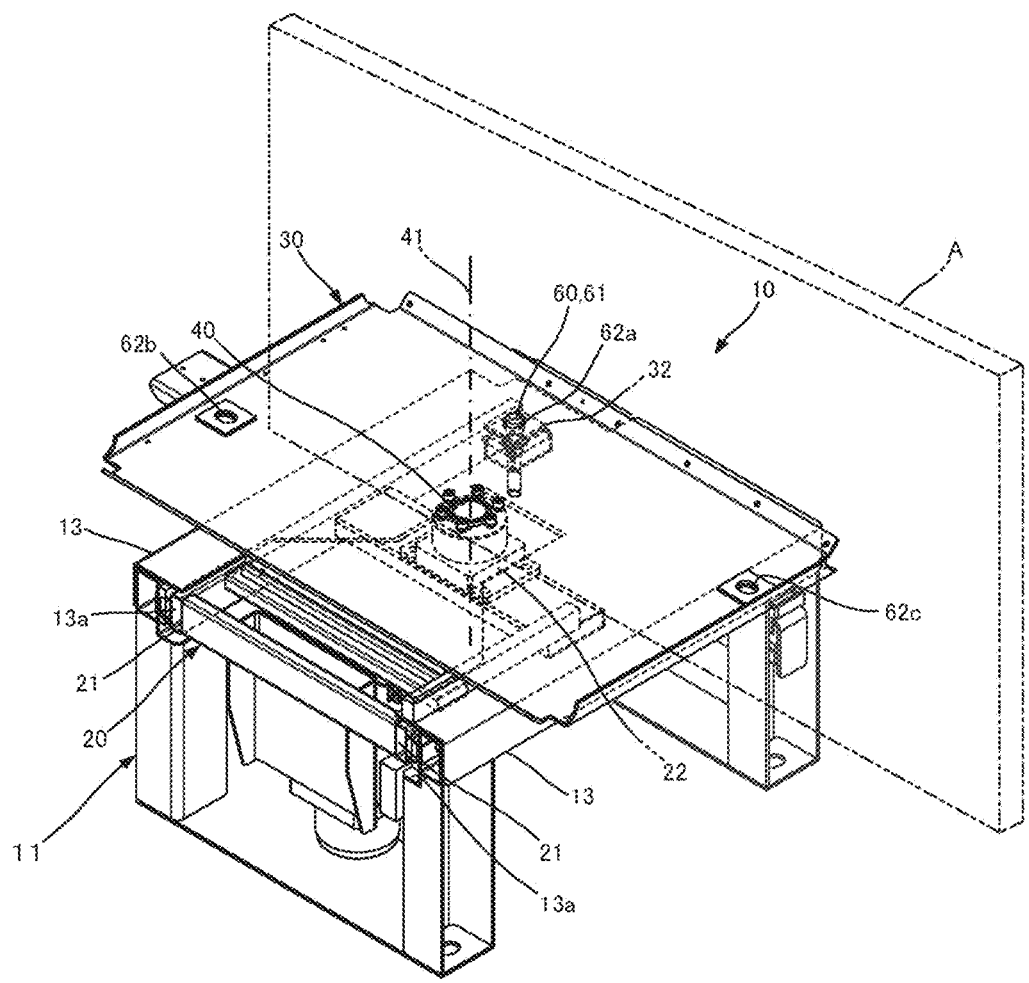
FIG. 1 is a perspective view showing a long state of a seat device according to an embodiment.

As shown in FIG. 1, the seat device 10 includes a leg stand 11 fixed on a floor surface, a movable stand 20 supported by the leg stand 11 so as to be able to advance/retract in front and back directions, the underframe 30 of the seat supported by the movable stand 20 so as to be rotatable in forward and backward directions, and an interlocking mechanism 50 that interlocks the advancement/retraction of the movable stand 20 with the rotation of the underframe 30. Here, the leg stand 11 is an example of a "base" of the present invention, and the movable stand 20 is an example of a "slider" of the present invention. Note that the seat device 10 is arranged on the floor surface near a wall in the cabin of the railroad car, and "A" in FIG. 1 is a part of the wall parallel to the moving direction of the railroad car.

The seat device 10 is convertible in the orientation of the seat between a "long state" (refer to FIG. 1) in which the back of the seat is substantially parallel to and along the wall A, a "cross state" (refer to FIG. 2) that is substantially orthogonal to the long state, and a "reverse cross state" (refer to FIG. 3) that is 180 degrees in the opposite direction to the cross state. Here, when it is assumed that the long state of the seat has a rotation angle of 0 degree as an original position, the rotation angle of the cross state is 90 degrees, and the rotation angle of the reverse cross state is −90 degrees. Note that, although the illustration of the seat itself is omitted, for example, a stool for two persons is formed by arranging two seating portions and backrests side by side in both directions.

<Leg Stand 11>

As shown in FIG. 1, the leg stand 11 is fixed on the floor surface in the vicinity of the wall A in the cabin. The leg stand 11 is formed by combining frame members into the shape of a stand that is long in a direction substantially orthogonal to the wall A. An upper surface part 12 covering the upper side of the leg stand 11 is formed into a substantially rectangular plate-like shape, and is arranged in a substantially horizontal state. As for the orientation of the upper surface part 12, long sides (side portions 13) on the both sides extending in a longitudinal direction are substantially orthogonal to the wall A, and shorter sides on the front and back of the upper surface part 12 are arranged to be substantially parallel to the wall A.

Figure 4:
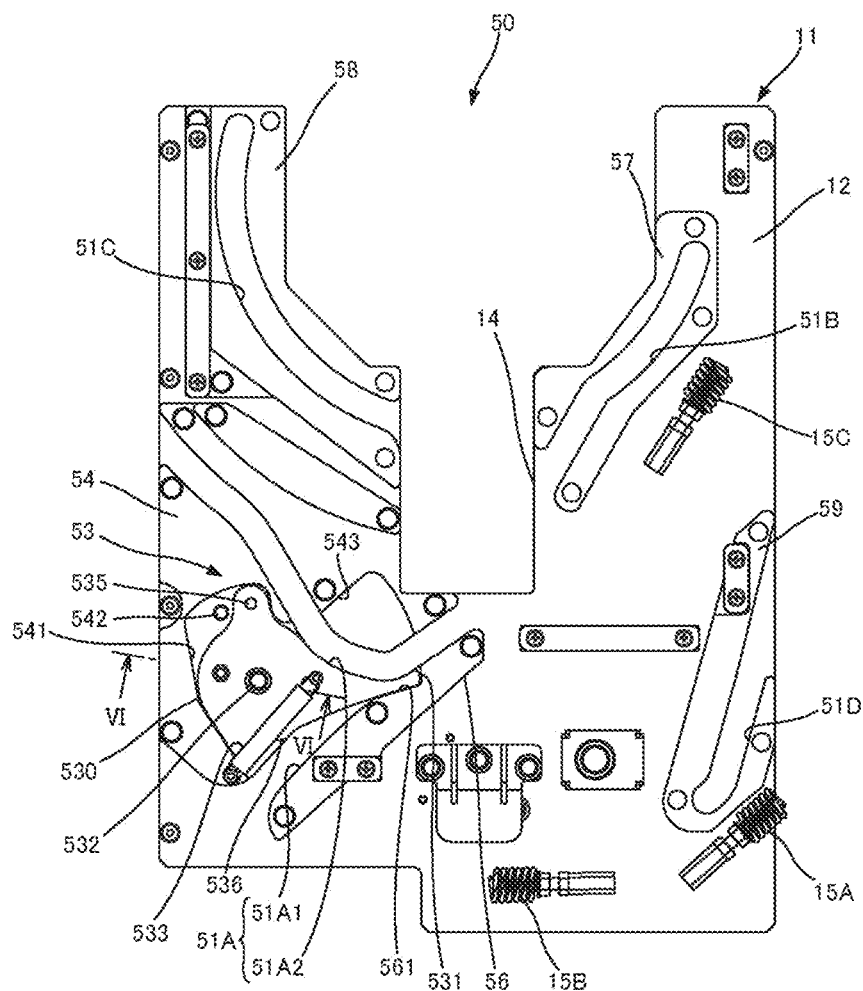
FIG. 4 is a plan view showing an important part of an interlocking mechanism of the seat device according to the embodiment.
Figure 5:
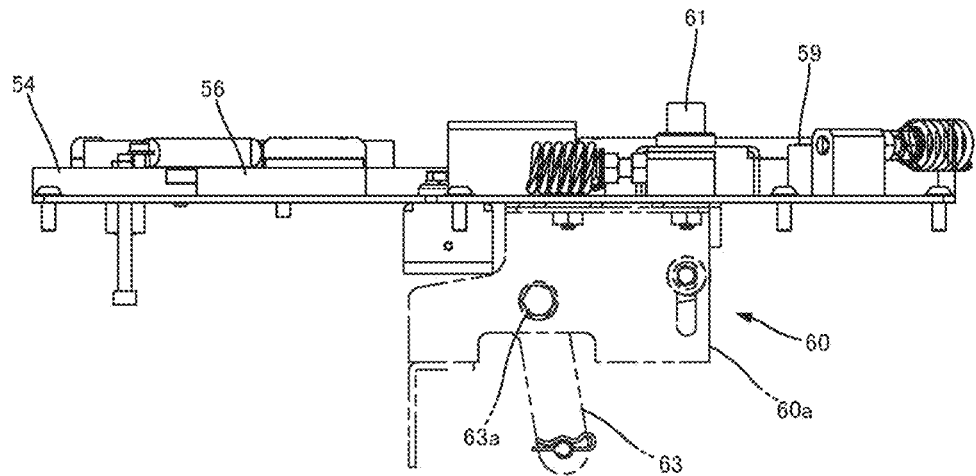
FIG. 5 is a rear view showing the important part of the interlocking mechanism of the seat device according to the embodiment.
Figure 6:
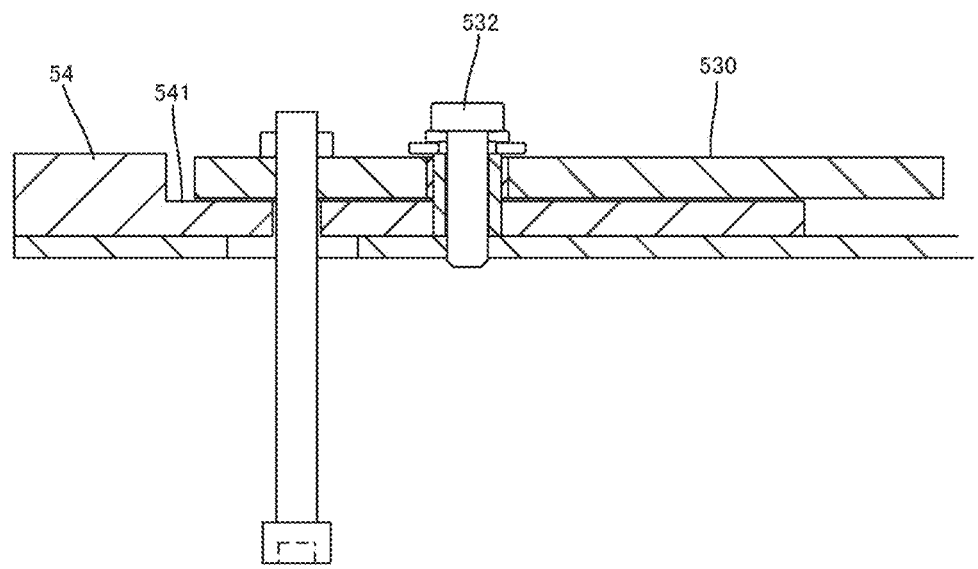
FIG. 6 is a VI-VI line cross-sectional view of FIG. 4.

As shown in FIG. 4, the upper surface part 12 is provided with an advancement/retraction guiding portion 14 where a rotation mechanism 40, which moves with the advancement/retraction of the movable stand 20 described later, can pass along its movement trajectory. The advancement/retraction guiding portion 14 is provided as a notch extending from the short side on the front side toward the substantially center of the upper surface part 12. The advancement/retraction guiding portion 14 is a portion for avoiding the rotation mechanism 40 from interfering with the upper surface part 12.

Additionally, associated parts, such as spring members 15A, 15B, and 15C as stoppers for regulating the rotation direction of the underframe 30, are disposed on the upper surface part 12, in addition to the components of the interlocking mechanism 50 described later. Here, the spring member 15A performs the positioning of the long state of the seat, the spring member 15B performs the positioning of the cross state of the seat, and the spring member 15C performs the positioning of the reverse cross state of the seat. Note that receiving members to be engaged with the respective spring members 15 are provided in the underframe 30.

<Movable Stand 20>

Figure 2:
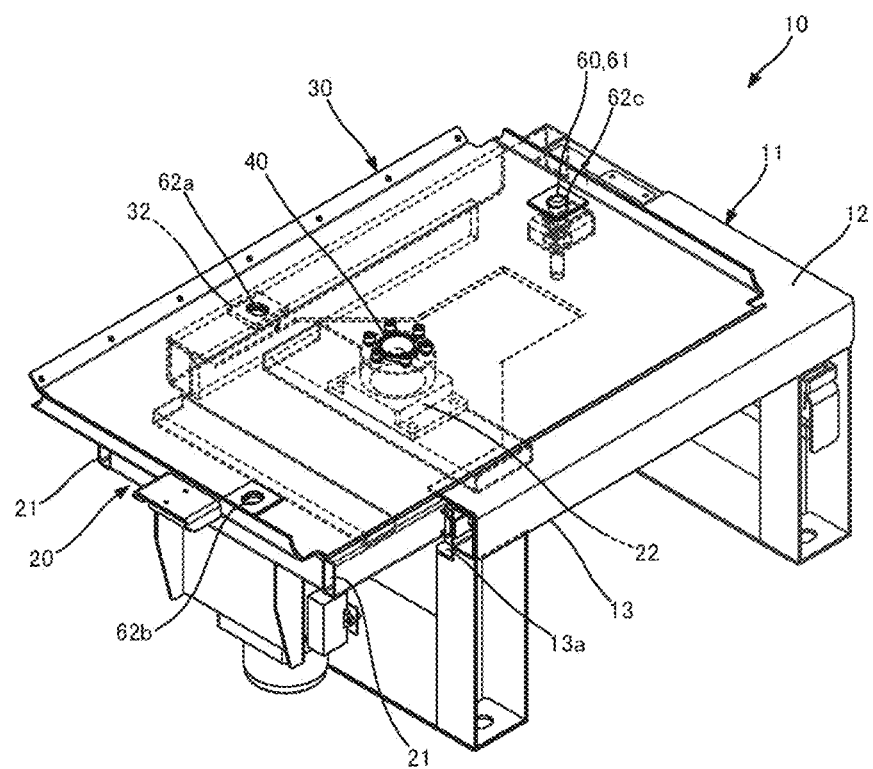
FIG. 2 is a perspective view showing a cross state of the seat device according to the embodiment.
Figure 3:
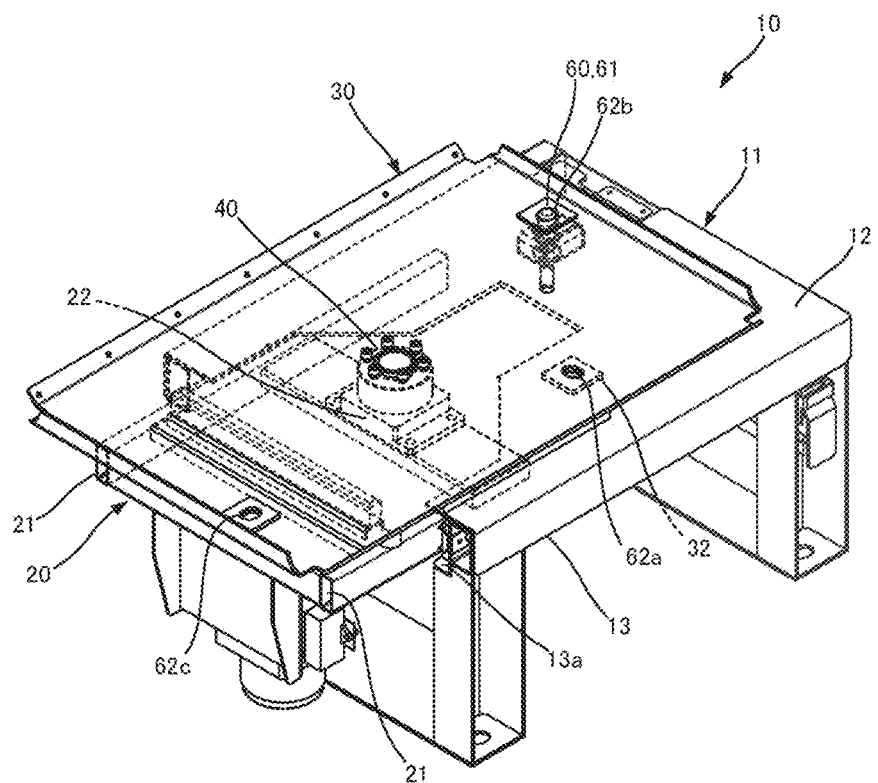
FIG. 3 is a perspective view showing a reverse cross state of the seat device according to the embodiment.

As shown in FIG. 1 to FIG. 3, the movable stand 20 is attached immediately below the upper surface part 12 of the leg stand 11, so as to be able to advance/retract in a direction substantially orthogonal to the wall A via a sliding mechanism. The sliding mechanism includes a pair of guide rails 13a and 13a provided inside both side portions 13 and 13 of the leg stand 11. The pair of guide rails 13a and 13a face each other in parallel along both the long sides of the upper surface part 12 of the leg stand 11, and the both side portions 21 and 21 of the movable stand 20, which will be described next, are directly and slidably engaged with the inside of the respective guide rails 13a The movable stand 20 is arranged below the upper surface part 12 of the leg stand 11, and is formed by combining the frame members into a rectangular frame shape. The both side portions 21 of the movable stand 20 are slidably engaged with the inside of the aforementioned guide rails 13a. Therefore, the movable stand 20 is slidable so as to advance or retract in the direction substantially orthogonal to the wall A.

<Rotation Mechanism 40>

As shown in FIG. 1, an attaching portion 22 of the rotation mechanism 40, which rotatably supports the seat, is provided in the substantially center of the movable stand 20. The underframe 30 is rotatably supported on the movable stand 20 in a substantially horizontal direction by the rotation mechanism 40. The rotation mechanism 40 is formed as a unit in which, for example, a pair of upper and lower ring-shaped turntables are rotatably combined with each other by interposing a bearing, etc. between them, although an illustration is omitted. In this rotation mechanism 40, the lower turntable is fixed to the attaching portion 22, and the upper turntable is fixed to a bottom surface side of the underframe 30.

A rotation axis 41 (refer to FIG. 1) of the rotation mechanism 40 serving as the rotation center of the seat is the center line of the upper and lower turntables, and is not physically embodied in the present embodiment. Here, the rotation axis 41 extends upwards from the underside of the upper surface part 12 of the leg stand 11, and does not interfere with the upper surface part 12 by passing through the advancement/retraction guiding portion 14. As mentioned above, the underframe 30 is integrally attached to the upper turntable, which forms the surrounding of the rotation axis 41, and the seat and the underframe 30 are rotated about the rotation axis 41.

Additionally, the rotation mechanism 40 includes an electric motor, although an illustration is omitted. This electric motor is provided with, for example, a reducer, and on its output axis, for example, a sprocket that is integrally rotated is supported.

<Underframe 30>

As shown in FIG. 1 to FIG. 3, the underframe 30 is arranged on the upper side of the upper surface part 12 of the leg stand 11, and is formed by, for example, a substantially rectangular metal plate. The underframe 30 is for supporting a seat when the seat is attached, and has a shape that is long in both directions that correspond to a bottom surface of a seating portion of the seat. For example, a gear, etc. with which the gear tooth of the sprocket of the electric motor engage is provided on the bottom surface side of the underframe 30 about the rotation axis 41, although an illustration is omitted.

Therefore, the seat is configured to be rotated by the power of the electric motor. Although described later in detail, the conversion of the seat from the long state to the cross state, and the conversion from the reverse cross state to the cross state are performed by the forward rotation of the electric motor. On the other hand, the conversion of the seat from the cross state to the reverse cross state, and the conversion from the cross state to the long state are set to be performed by the reverse rotation of the electric motor. Note that the seat can also be manually rotated with the rotation mechanism 40.

<Interlocking Mechanism 50>

Additionally, the seat device 10 includes the interlocking mechanism 50 that interlocks the rotation and advancement/retraction of the seat so that the seat does not interfere with the wall A, when converting the seat to the long state, the cross state, and the reverse cross state. When the seat is rotated with the underframe 30, the interlocking mechanism 50 converts the rotation of the underframe 30 into linear motion to be transmitted to the movable stand 20, and makes the movable stand 20 advance/retract with the underframe 30 in a linear direction so as to be close to or separated from the wall A.

Figure 9:
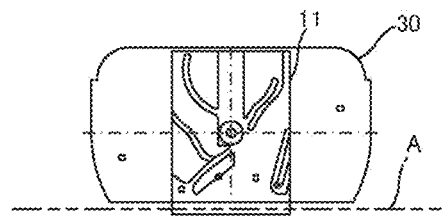
FIG. 9 is an explanatory diagram showing operations of converting the seat from the long state to the cross state, and from the cross state to the reverse cross state in the seat device according to the embodiment.
Figure 9:
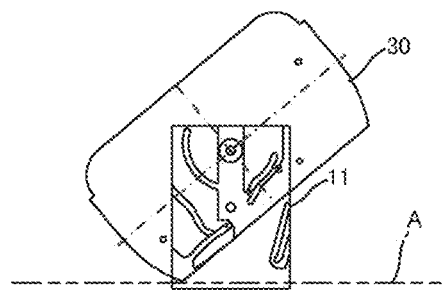
Figure 9:
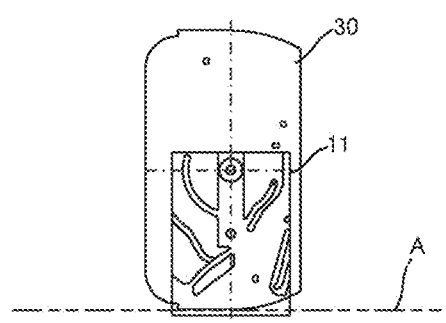
Figure 9:
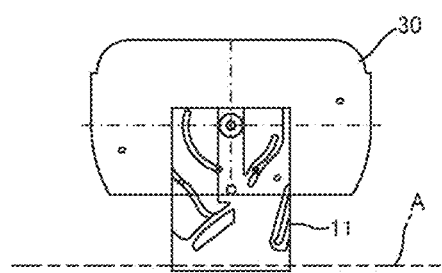
Figure 9:
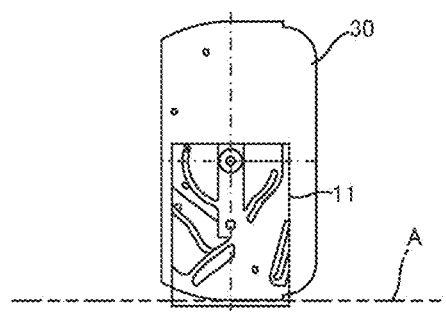

The interlocking mechanism 50 includes cam groove 51 provided in the upper surface part 12 of the leg stand 11 as shown in FIG. 4, and a rotary member 52 that is provided in the bottom surface side of the underframe 30 as shown in FIG. 9, and engages with the cam groove 51 so as to be able to move along the cam groove 51, the engagement with the cam groove always being maintained while regulating all the trajectories of the rotation or advancement/retraction of the underframe 30 (seat), and a switching portion 53 provided in the cam groove 51 as shown in FIG. 4. Here, the cam groove 51 is an example of a "cam path" of the present invention, and the rotary member 52 is an example of an "engagement portion" of the present invention.

<<Cam Groove 51>>

The cam groove 51 consists of, for example, a first cam groove 51A, a second cam groove 51B, a third cam groove 51C, and a fourth cam groove 51D as a plurality of cam grooves 51 arranged around the advancement/retraction guiding portion 14 in the upper surface part 12 of the leg stand 11. Note that, when collectively referring to the first cam groove 51A, the second cam groove 51B, the third cam groove 51C, and the fourth cam groove 51D, they are merely written as the cam groove 51. Additionally, in each cam groove 51, it is assumed that an end facing the rear (the lower part of the paper of FIG. 4) of the underframe 30 is "one end side", and an end facing the front (the upper part of the paper of FIG. 4) of the underframe 30 is "the other end side."

The first cam groove 51A consists of a main channel 51A1 that diagonally and substantially linearly extends from a closed end side of the advancement/retraction guiding portion 14 toward the rear left side of the upper surface part 12, one end side being opened in a reference surface of the upper surface part 12, and the other end side communicating with the closed end side of the advancement/retraction guiding portion 14, and a sub channel 51A2 that is branched from the middle of the main channel 51A1 to diagonally extend toward the front left side of the upper surface part 12, and is opened in the side portion 13.

Although described later, when converting the seat from the long state to the cross state, in its first-half process, the first cam groove 51A guides a corresponding first rotary member 52A to the main channel 51A1, and when converting the seat from the cross state to the reverse cross state, in the middle of the process, the first cam groove 51A guides the first rotary member 52A from the main channel 51A1 to the sub channel 51A2 via a branch point.

The second cam groove 51B diagonally and substantially linearly extends toward the front right side of the upper surface part 12 from the middle of one side of the advancement/retraction guiding portion 14, then extends in a substantially arc shape, one end side of the substantially linear portion communicating with the middle of the one side of the advancement/retraction guiding portion 14, and the other end side of the substantially arc portion is closed.

Although described later, when converting the seat from the long state to the cross state, in its latter-half process, the second cam groove 51B guides a corresponding second rotary member 52B, and when converting the seat from the cross state to the reverse cross state, in its first-half process, the second cam groove 51B guides the second rotary member 52B.

The third cam groove 51C extends in a substantially arc shape toward the front left side of the upper surface part 12 from the middle of one side of the advancement/retraction guiding portion 14, one end side communicating with the middle of the one side of the advancement/retraction guiding portion 14, and the other end side being closed.

Although described later, when converting the seat from the cross state to the reverse cross state, in its latter-half process, the third cam groove 51C guides the corresponding second rotary member 52B.

The fourth cam groove 51D diagonally and substantially linearly extends toward the front right side on the right side of an rear end of the upper surface part 12, one end side being closed, and the other end side being opened the side portion 13. Here, only the one end side of the fourth cam groove 51D is formed into an arc shape having a slight rotation angle (for example, 2 degrees) about the rotation axis 41 guided by the advancement/retraction guiding portion 14.

Although described later, when converting the seat from the long state to the cross state, in its first process, the fourth cam groove 51D guides the corresponding third rotary member 52C.

As shown in FIG. 4, the first cam groove 51A is formed as, for example, a gap that is recessed into a guide member 54 having a predetermined board thickness (height) overlapped with and fixed to a reference surface in the upper surface part 12 of the leg stand 11, and that is between the guide member 54 and another guide members 56. The second cam groove 51B is recessed in the longitudinal direction of another guide member 57. The third cam groove 51C is recessed in the longitudinal direction of still another guide member 58. The fourth cam groove 51D is recessed in the longitudinal direction of yet another guide member 59.

Additionally, in the reference surface of the upper surface part 12, the heights of the other second cam groove 51B, third cam groove 51C, and fourth cam groove 51D are set to be one step higher than the height of the first cam groove 51A. Accordingly, even when the trajectories of the rotary members 52B and 52C, which will be described next and engaged with the other cam grooves 51B, 51C, and 51D, are overlapped with the first cam groove 51A in plan view, the trajectories do not interfere with the first cam groove 51A.

Note that, in the cabin of the railroad car, the seat devices 10 are arranged so as to be aligned back and forth in a row along each of the walls on the both sides of the moving direction, and the space between the rows serves as a passage. Therefore, each cam groove 51 of the interlocking mechanism 50 may be provided to have mutually symmetrical shape in the seat devices 10 of both the rows. In this case, the forward rotation of the seat in the seat device 10 on one wall side is the reverse rotation of the seat in the seat device 10 on the other wall side.

<<Rotary Member 52>>

As shown in FIG. 10 to FIG. 13, the rotary member 52 consists of, for example, a first rotary member 52A, a second rotary member 52B, and a third rotary member 52C, as a plurality of rotary members 52 arranged at positions eccentric from the rotation axis 41 of the seat, in the bottom surface side of the underframe 30. Note that, when collectively referring to the first rotary member 52A, the second rotary member 52B, and the third rotary member 52C, they are merely written as the rotary member 52.

Each rotary member 52 has a different distance from the rotation axis 41 of the seat. The first rotary member 52A corresponds to and is rotatably engaged and guided by the first cam groove 51A. The second rotary member 52B corresponds to and is rotatably engaged and guided by the second cam groove 51B and the third cam groove 51. The third rotary member 52C corresponds to and is rotatably engaged and guided by the fourth cam groove 51D.

Each rotary member 52 consists of, for example, a roller rotatably supported by an axis protruding downward from the bottom surface side of the underframe 30. Here, the length in an axial direction of each rotary member 52 protruding downward is set according to the height of each aforementioned cam groove 51. That is, only the first rotary member 52A, which is engaged with the first cam groove 51A that is one step lower than the other cam grooves 51B, 51C, and 51D, protrudes downward longer than the other rotary members 52B and 52C.

The position at which each rotary member 52 is engaged with each cam groove 51 is changed with the rotation of the underframe 30 of the seat. Each rotary member 52 is engaged with and guided by each cam groove 51 with the rotation of the underframe 30, and the rotation of the underframe 30 is converted into linear motion to be transmitted to the movable stand 20. Accordingly, it is possible to convert the seat from the long state to the cross state, from the cross state to the reverse cross state, and further to the original long state.

<<Switching Portion 53>>

As shown in FIG. 4, the switching portion 53 includes a mover 530 that switches the direction to which the first rotary member 52A is guided at the branch point between the main channel 51A1 and the sub channel 51A2 of the first cam groove 51A. Each of the guide members 54 and 56 that form the first cam groove 51A is arranged so as to form a T-shaped gap, which is the branch point between the main channel 51A1 and the sub channel 51A2.

Of each of the guide members 54 and 56, a housing portion 541 oscillatably housing the mover 530, which is formed into a predetermined plate-like shape, is provided in the guide member 54 that forms a wall on one side of the main channel 51A1, and in which the sub channel 51A2 is recessed. Additionally, the recesses 543 and 561 into which an oscillation end 531 of the mover 530 oscillatably fits are provided in the opposing side of the guide members 54 and 56, respectively. The mover 530 is oscillatably attached to the housing portion 541 via a screw 532.

The oscillation end 531 of the mover 530 fits into the recess 543 in the guide member 54 (refer to an enlarged view in FIG. 11(f)), and can be oscillated (displaced) between an "outbound state" in which the first rotary member 52A is guided from one end side to the other end side of a main path 51A1 in one direction, and a "branch state" in which first rotary member 52A is guided to the sub channel 51A2 on the way (at the branch point) from the other end side to the one end side of the main channel 51A1. Here, the mover 530 is biased by a spring member 533, which is a biasing means, so as to be normally maintained in the branch state.

The mover 530 includes an inclined surface 534 that is inclined so as to cross from one guide member 54 to the other guide member 56, from the one end side toward the other end side of the main path 51A1 in the branch state. The mover 530 is set to be temporarily displaced into the outbound state against the biasing force of the spring member 533, when the inclined surface 534 is pressed by the first rotary member 52A with the passing of the first rotary member 52A that has moved from the one end side of the main channel 51A1 in the branch state.

Additionally, although described later in detail, after the mover 530 is operated from the branch state to the outbound state against the biasing force of the spring member 533 by predetermined power, the mover 530 can be temporarily fixed to the outbound state. That is, on one end side of the mover 530, for example, a circular hole 535 and a spherical cap 542 that allow temporary fixing engagement as ball plungers are provided in the bottom surface of the housing portion 541 and the opposing rear surface.

Further, a protrusion 536 that cancels the temporary fixing state is provided on the other end side of the mover 530. That is, when the mover 530 is in the temporarily fixed outbound state, and when the first rotary member 52A collides with the protrusion 536 with the passing of the first rotary member 52A that has moved from the other end side of the main channel 51A1, it is set to cancel the aforementioned temporary fixing state, and to return to the branch state by the biasing force of the spring member 533.

<Rotation Lock Mechanism 60>

Additionally, the seat device 10 includes a rotation lock mechanism 60 that locks the underframe 30 (seat) in a non-rotatable manner at the rotation positions of the long state, the cross state, and the reverse cross state, respectively. Here, since the rotation lock mechanism 60 locks the underframe 30 to the leg stand 11 in a non-rotatable manner, the movable stand 20 is also inevitably locked to the leg stand 11 in a way that prevents advancement/retraction.

As shown in FIG. 2 to FIG. 4, the rotation lock mechanism 60 includes a lock pin 61 that can protrude up and down from the leg stand 11 side to the underframe 30, and locking holes 62a, 62b, and 62c that are provided in the underframe 30, and to which the lock pin 61 are engaged and from which the lock pin 61 is released. A total of three locking holes 62a, 62b, and 62c are provided on one long side along the back of the seat, and on both short sides along both sides of the seat in the rectangular underframe 30, respectively.

The lock pin 61 is incorporated in a unit 60a, and the unit 60a is attached to the underside of the upper surface part 12 of the leg stand 11. A hole into which the lock pin 61 is fit is formed in the upper surface part 12, and the lock pin 61 can protrude upward from the upper surface part 12 of the leg stand 11. When the seat is converted to the long state, the cross state, and the reverse cross state, the lock pin 61 performs locking by fitting into the locking holes 62a, 62b, and 62c on the underframe 30 side, which correspond to the lock pin 61 up and down at the respective positions.

To be specific, in the long state shown in FIG. 1, the lock pin 61 is inserted into and engaged with the locking hole 62a on one long side of the underframe 30. Additionally, in the cross state shown in FIG. 2, the lock pin 61 is inserted into and engaged with the locking hole 62c on one short side of the underframe 30. Further, in the reverse cross state shown in FIG. 3, the lock pin 61 is inserted into and engaged with the locking hole 62b on the other short side of the underframe 30.

The lock pin 61 performs protruding operations with an electric operation and a manual operation, and is displaced between lock positions at which the lock pin 61 protrudes upward and is inserted into the locking holes 62a, 62b, and 62c, and lock release positions at which the lock pin 61 retracts downward and is disengaged from the locking holes 62a, 62b, and 62c. The electric motor of the rotation mechanism 40 is also used as the driving source for performing electric operations of the lock pin 61.

The electric motor includes a clutch, and is configured to be able to switch between the operation of rotating the seat by the rotation mechanism 40, and the operation of retracting the lock pin 61 to release the lock, by switching of the clutch. That is, two operations, the rotation of the seat and the release of the lock, can be performed by one electric motor. Note that, since the configuration regarding the clutch of the electric motor is common, a detailed description is omitted.

To be specific, a difference is provided between the electric operation and the manual operation for the stroke of the lock pin 61 from the lock position to the lock release position. As shown in FIG. 7, the lock pin 61 is incorporated in the unit 60a, so as to perform the protruding operations via a drive mechanism that includes a link 63 having an end as a rotation center 63a.

An electric side cable 64 and a manual side cable 65 for driving the link 63 are connected to portions of the link 63 with different turning radius, respectively. When the operation amount of each of the cables 64 and 65 is the same, the stroke by the cable closer to the rotation center 63a of the link 63 becomes larger. By utilizing this difference in the turning radius, the stroke of the lock pin 61 by the manual side cable 65 is set to be a half of that in the case of the electric side cable 64.

On the other hand, as for the locking holes 62a, 62b, and 62c with which the lock pin 61 is engaged and from which the lock pin 61 is released, as shown in FIG. 8(a), a sheet metal 32 with a hole corresponding to the locking hole 62a is attached to the underside of the locking hole 62a for locking the seat in the long state. Therefore, as for the locking hole 62a, it is set so that the lock cannot be released unless the lock pin 61 is stroked more by the thickness of the sheet metal 32 than for the other locking holes 62b and 62c (refer to FIG. 8(b)).

In short, when the seat is in the long state, the lock of the rotation lock mechanism 60 is set so that the lock cannot be released by an operation of the manual side cable 65, and can only be released by an operation of the electric side cable 64. Note that the electric operation is performed by a crew or station staff of a vehicle, and the manual operation is mainly performed by a passenger.

According to such a rotation lock mechanism 60, the lock pin 61 protrudes from the leg stand 11 fixed to the vehicle. Therefore, when the underframe 30 is locked in a non-rotatable manner, the movable stand 20 to which the underframe 30 is supported via the rotation mechanism 40 is also simultaneously locked in a way that prevents advancement/retraction. However, in addition to the rotation lock mechanism 60, an advancement/retraction lock mechanism may be separately provided that restrains the underframe 30 (seat) in a way that prevents advancement/retraction in each of the positions of the long state and the cross state.

<Actions of Seat Device 10>

Next, the actions of the seat device 10 according to the present embodiment will be described.

As shown in FIG. 9, when the underframe 30 of the seat is rotated, the rotation of the underframe 30 is also converted to linear motion by the interlocking mechanism 50, and is transmitted to the movable stand 20. Therefore, the movable stand 20 advances/retracts in the direction orthogonal to the wall A (refer to FIG. 1) with the rotating underframe 30.

With such interlocking of the rotation and advancement/retraction of the seat, even when the seat is close to the wall A, the orientation of the seat can be easily converted between the long state (FIG. 9(a)) in which the back of the seat is substantially parallel to and along the wall A, the cross state (FIG. 9(c)) that is substantially orthogonal to the long state, and the reverse cross state (FIG. 9(e)) that is 180 degrees in the opposite orientation to the cross state, by a series of operations without interfering with the wall A.

<<Conversion of State of Seat>>

As shown in FIG. 1, when the underframe 30 of the seat is in the long state (the rotation angle 0 degree), the lock pin 61 of the rotation lock mechanism 60 is fit into and locked by the locking hole 62a on the one side of the underframe 30. Here, since the lock pin 61 protrudes from the leg stand 11 fixed on the floor surface, the seat is simultaneously locked not only in a non-rotatable manner, but also in a way that prevents advancement/retraction.

As shown in FIG. 9(a) to (c), when converting the seat from the long state to the cross state (the rotation angle 90 degrees), it is performed by an electric operation. Although an extra stroke for the thickness of the sheet metal 32 shown in FIG. 8(a) is required in order to disengage the lock pin 61 of the rotation lock mechanism 60 from the locking hole 62a, this large stroke is enabled by an electric operation.

After the lock of the rotation lock mechanism 60 is released in the long state shown in FIG. 9(a), when the underframe 30 is rotated in the forward direction (the counterclockwise direction in FIG. 9) by the electric motor as shown in FIG. 9(b), the underframe 30 is rotated while being advanced by the interlocking mechanism 50. That is, the underframe 30 is rotated while being advanced, while being rotated in the forward direction so as not to interfere with the wall A (refer to FIG. 1).

As shown in FIG. 9(c), when the underframe 30 reaches the cross state (the rotation angle 90 degrees), as shown in FIG. 2, the lock pin 61 of the rotation lock mechanism 60 is fit into the locking hole 62*b* on the one short side of the underframe 30, and the underframe 30 is locked in a non-rotatable manner.

As shown in FIG. 9(*c*) to (*e*), when converting the seat from the cross state to the reverse cross state (the rotation angle −90 degrees), it is performed by a manual operation or an electric operation. Here, in order to disengage the lock pin 61 of the rotation lock mechanism 60 from the locking hole 62*b*, since there is no sheet metal 32 shown in FIG. 8(*a*), only a small stroke is required. Therefore, the lock of the rotation lock mechanism 60 can be released not only by an electric operation but also by a manual operation.

After the lock of the rotation lock mechanism 60 is released in the cross state shown in FIG. 9(*c*), when the underframe 30 is rotated in the backward direction (the clockwise direction in FIG. 9) as shown in FIG. 9(*d*), the underframe 30 retracts and advances while being rotated by the interlocking mechanism 50, and will be in an advanced long state once in which the underframe 30 has advanced in a state parallel to the long state. In this advanced long state, the underframe 30 is rotated in the backward direction without advancement/retraction.

As shown in FIG. 9(*e*), when the underframe 30 reaches the reverse cross state (−90 degree), the lock pin 61 of the rotation lock mechanism 60 fits into the locking hole 62*c* on the other short side of the underframe 30, and the underframe 30 is locked in a non-rotatable manner.

Additionally, in order to return the seat from the reverse cross state to the cross state, and further from the cross state to the original long state, the reverse operations of the aforementioned conversion from the long state to the cross state, and from the cross state to the reverse cross state via the advanced long state may be performed, respectively. These reverse operations will be described later.

<<Operations of Interlocking Mechanism 50>>

Next, based on FIG. 10 to FIG. 13, the operations of the interlocking mechanism 50 with the conversion of the orientation of the seat will be described in detail.

As shown in FIG. 10(*a*), when the underframe 30 of the seat is in the long state (the rotation angle 0 degree), the third rotary member 52C is engaged with the closed end of the fourth cam groove 51D in the interlocking mechanism 50.

<<<From Long State to Cross State>>>

When converting the seat from the long state to the cross state, first, the lock pin 61 is disengaged from the locking hole 62*a* by the electric motor to release the lock. Then, the underframe 30 is shifted by being slightly rotated in the forward direction (the counterclockwise direction in FIG. 10) as shown in FIG. 10(*b*), by the biasing force of the spring member 15 in the upper surface part 12 of the leg stand 11. At this time, the third rotary member 52C is guided to the arc-shaped portion having a slight rotation angle (for example, 2 degrees) in the one end side of the fourth cam groove 51D. Accordingly, it is possible to prevent the lock pin 61 whose lock is temporarily released from fitting into the locking hole 62*a* again.

Subsequently, when the underframe 30 is rotated in the forward direction, as shown in FIG. 10(*c*) to (*d*), the third rotary member 52C passes the arc-shaped portion on the one end side of the fourth cam groove 51D, and thereafter is directly guided to the other end side of the fourth cam groove 51D that diagonally intersects the advancement/retraction direction of the seat. Accordingly, the initial operation at the start of the rotation of the seat rotation can be smoothly performed. At this time, when the underframe 30 is biased in the rotation direction by the spring member 15, the torque of the electric motor will be supported. Note that, since the underframe 30 will be in a state where the underframe 30 is pushed by the biasing force of the spring member 15C, rattling is also prevented, and the stability of supporting the seat is also increased.

Here, for example, when the fourth cam groove 51D and the third rotary member 52C are omitted, and the first cam groove 51A is made to guide the first rotary member 52A from the beginning, since the first rotary member 52A is engaged with the first cam groove 51A substantially perpendicularly to the rotation direction, there is a possibility that the force is not be distributed in an advancement direction and the first cam groove 51A is not moved. The aforementioned initial operation is an idea for the case of making one electric motor perform the two operations, the protrusion of the lock pin 61 and the rotation of the seat. If the initial operation is configured to be performed by a power source that is different from the one electric motor, the fourth cam groove 51D and the third rotary member 52C can also be omitted.

As shown in FIG. 10(*d*), when the third rotary member 52C is in the process of escaping the arc-shaped portion on the one end side of the fourth cam groove 51D toward the other end side, the first rotary member 52A is engaged from the one end side of the first cam groove 51A. As shown in an enlarged view in FIG. 10(*d*), the first rotary member 52A is fit from the opened one end side of the main path 51A1 of the first cam grooves 51A. The one end side of the main path 51A1 has a widely opened shape so that the first rotary member 52A can easily enter.

As shown in FIG. 10(*e*), when the first rotary member 52A is in the process of heading toward the other end side of the main path 51A1 of the first cam groove 51A, the third rotary member 52C escapes to the outside from the opened other end side of the fourth cam groove 51D.

Subsequently, as shown in FIG. 11(*f*), when the first rotary member 52A comes to the branch point at which the sub channel 51A2 is branched from the middle of the main path 51A1 of the first cam groove 51A, the first rotary member 52A passes the switching portion 53 at the branch point, and directly heads toward the other end side of the main path 51A1. At this time, as shown in an enlarged view in FIG. 11(*f*), the first rotary member 52A presses the inclined surface 534 of the mover 530, thereby temporarily displacing, against the biasing force of the spring member 533, the mover 530 into the outbound state where the first rotary member 52A can pass.

As shown in FIG. 11(*g*), before the first rotary member 52A escapes to the outside from the other end side of the main path 51A1 of the first cam groove 51A, the second rotary member 52B is engaged from the opened one end side of the second cam groove 51B. Additionally, when the first rotary member 52A finishes passing the switching portion 53, as shown in an enlarged view in FIG. 11(*g*), the mover 530 returns to the branch state in which the other end side of the main path 51A1 and the sub channel 51A2 of the first cam groove 51A are communicated with each other by the biasing force of the spring member 533.

Next, as shown in FIG. 11(*h*) to (*i*), the underframe 30 reaches the cross state (the rotation angle 90 degrees) by the rotation in the forward direction (the counterclockwise direction in FIG. 11) of the underframe 30. At this time, after the second rotary member 52B is guided from the one end side to the other end side of the second cam groove 51B, the second rotary member 52B is engaged with the closed other end side and is stopped.

<<<From Cross State to Reverse Cross State>>>

When converting the seat from the cross state to the reverse cross state, in the cross state shown in FIG. 11(*i*), first, the lock pin 61 is disengaged from the locking hole 62*b* by a manual operation or the electric motor to release the lock. Next, when the underframe 30 is rotated in the reverse direction (the clockwise direction in FIG. 11), as shown in FIG. 12(*j*), the second rotary member 52B is guided from the other end side toward the one end side of the second cam groove 51B.

As shown in FIG. 12(*k*), before the second rotary member 52B escapes to the outside from the opened one end side of the second cam groove 51B, the first rotary member 52A is engaged from the opened other end side of the main path 51A1 of the first cam groove 51A. At this time, as shown in an enlarged view in FIG. 12(*k*), the mover 530 of the switching portion 53 at the branch point of the first cam groove 51A is held in the branch state where the other end side of the main path 51A1 and the sub channel 51A2 of the first cam groove 51A are communicated with each other, by the biasing force of the spring member 533.

As shown in FIG. 12(*l*), before the first rotary member 52A comes to the switching portion 53 from the other end side of the main path 51A1 of the first cam groove 51A, the second rotary member 52B escapes to the outside from the opened one end side of the second cam groove 51B.

Then, as shown in FIG. 12(*m*), with the rotation in the reverse direction (the clockwise direction in FIG. 12) of the underframe 30, the first rotary member 52A is guided from the other end side of the main path 51A1 of the first cam groove 51A to the sub channel 51A2 along the mover 530 of the switching portion 53. As shown in an enlarged view in FIG. 12(*m*), when the mover 530 is in the branch state, an outer edge 537 facing the sub channel 51A2 side forms a part of an inner wall of the sub channel 51A2.

Subsequently, when the underframe 30 is rotated in the reverse direction, the first rotary member 52A is guided from the one end side (the branch point) toward the other end side of the sub channel 51A2 of the first cam groove 51A. Then, as shown in FIG. 12(*n*), the underframe 30 advances with the rotation in the reverse direction, and will be in the advanced long state once in which the underframe 30 has advanced in a state parallel to the long state. At this time, the first rotary member 52A is still engaged with the other end side of the sub channel 51A2 of the first cam groove 51A, and this time, the second rotary member 52B is engaged from the opened one end side of the third cam groove 51C.

Figure 13:
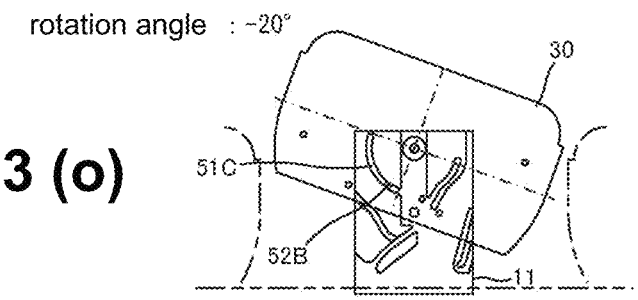
FIG. 13 is an explanatory diagram showing operations of a latter-half process at the time of converting the seat from the cross state to the reverse cross state in the interlocking mechanism of the seat device according to the embodiment.
Figure 13:
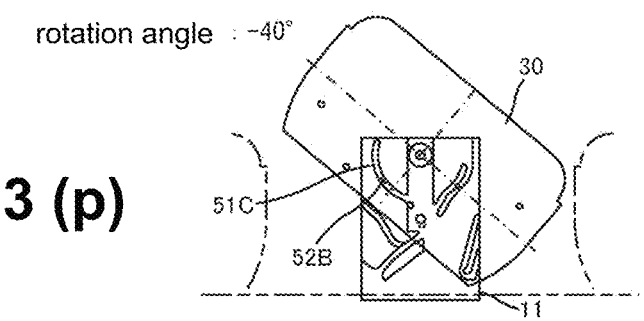
Figure 13:
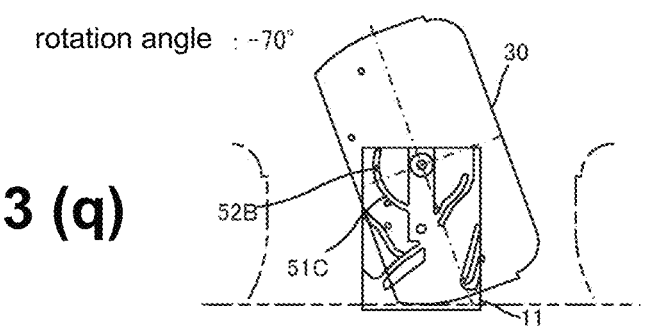
Figure 13:
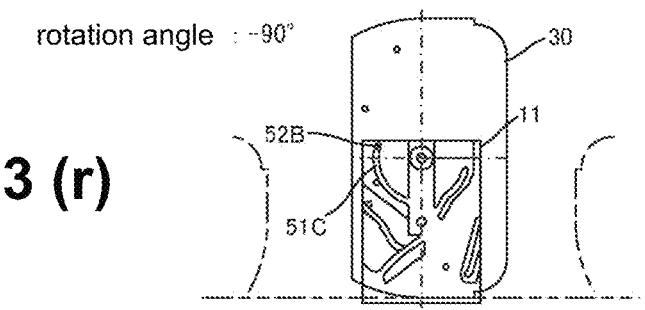

As shown in FIG. 13(*o*) to (*r*) continuously from the advanced long state shown in FIG. 12(*n*), when the underframe 30 is further rotated in the reverse direction (the clockwise direction in FIG. 13), the underframe 30 reaches the reverse cross state (the rotation angle −90 degrees). At this time, after the second rotary member 52B is guided from the one end side to the other end side of the third cam groove 51C, the second rotary member 52B is engaged with the closed other end side and is stopped. Note that, when the underframe 30 is in the process of reaching FIG. 13(*o*) from FIG. 12(*n*), the first rotary member 52A escapes to the outside from the opened other end side of the sub channel 51A2 of the first cam groove 51A.

<<<From Reverse Cross State to Cross State>>>

Additionally, when returning the seat from the reverse cross state to the cross state, as mentioned above, the reverse operations of the conversion from the cross state to the reverse cross state via the advanced long state sequentially shown in FIG. 11(*i*), FIG. 12(*j*) to (*n*), and FIG. 13(*o*) to (*r*) may be performed.

That is, the underframe 30 is rotated in the forward direction (the counterclockwise direction in FIG. 13) from the reverse cross state shown in FIG. 13(*r*) to be in the advanced long state shown in FIG. 12(*n*) first. At this time, the underframe 30 is not advanced/retracted, and the front and back position of the rotation axis 41 is maintained constant. With the subsequent rotation in the forward direction of the underframe 30, the seat is converted from the advanced long state to the cross state shown in FIG. 11(*i*). In such a process, the underframe 30 is retracted and advanced while being rotated, so as to follow the aforementioned reverse operations in the interlocking mechanism 50.

<<<From Cross State to Long State>>>

Further, when returning the seat from the cross state to the original long state, as mentioned above, the reverse operations of the conversion from the long state to the cross state sequentially shown in FIG. 10(*a*) to (*e*) and FIG. 11(*f*) to (*i*) may be performed.

That is, the underframe 30 is rotated in the reverse direction (the clockwise direction in FIG. 11) from the cross state shown in FIG. 11(*i*). In the process of the underframe 30 being rotated in the reverse direction, as shown in FIG. 11(*g*), the first rotary member 52A is engaged from the opened other end side of the main path 51A1 of the first cam groove 51A. Here, in order to convert the underframe 30 to the long state, it is necessary to make the first rotary member 52A head toward the one end side of the main path 51A1. However, as shown in the enlarged view in FIG. 11(*g*), the mover 530 of the switching portion 53 is in the ordinary branch state by the biasing force of the spring member 533.

Therefore, it is necessary to make the mover 530 of the switching portion 53 at the branch point of the sub channel 51A2 into the outbound state, instead of the ordinary branching state, so that the first rotary member 52A is guided from the other end side to the one end side of the main path 51A1 of the first cam groove 51A. Therefore, only at this time, the mover 530 is made into the outbound state against the biasing force of the spring member 533 by, for example, power. Here, the mover 530 can be temporarily fixed by oscillating the mover 530 until the circular hole 535 on its one end side is engaged with the spherical cap 542 at the branch point.

Further, since the temporary fixed state of the mover 530 is released when the first rotary member 52A collides with the protrusion 536 of the mover 530 at the time when the first rotary member 52A passes the switching portion 53 from the other end side toward the one end side of the main path 51A1, the mover 530 can be automatically returned to the original branch state by the biasing force of the spring member 533. Note that, in FIG. 11(*f*), in the temporary outbound state of the mover 530 due to pressing by the first rotary member 52A, for example, the oscillation of the mover 530 may be regulated to a position at which the temporary fixing is not performed.

<Modification of Seat Device 10>

Figure 14:
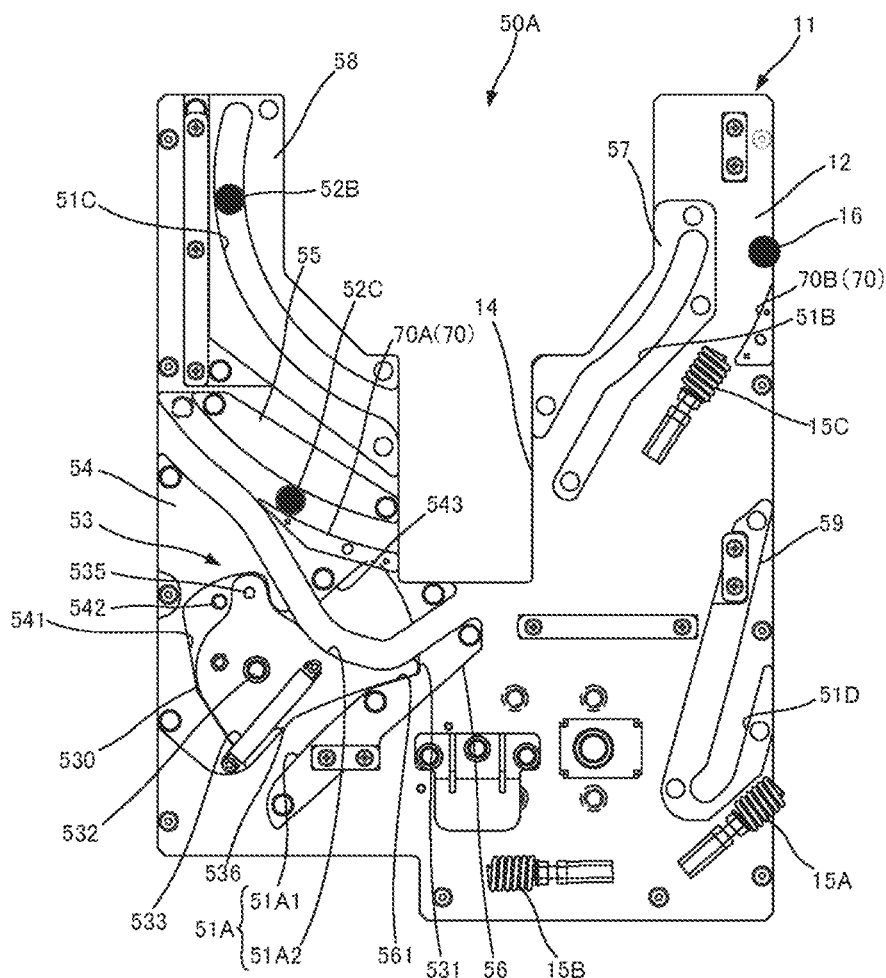
FIG. 14 is a plan view showing an important part of an interlocking mechanism of a seat device according to a modification of the embodiment.
Figure 15:
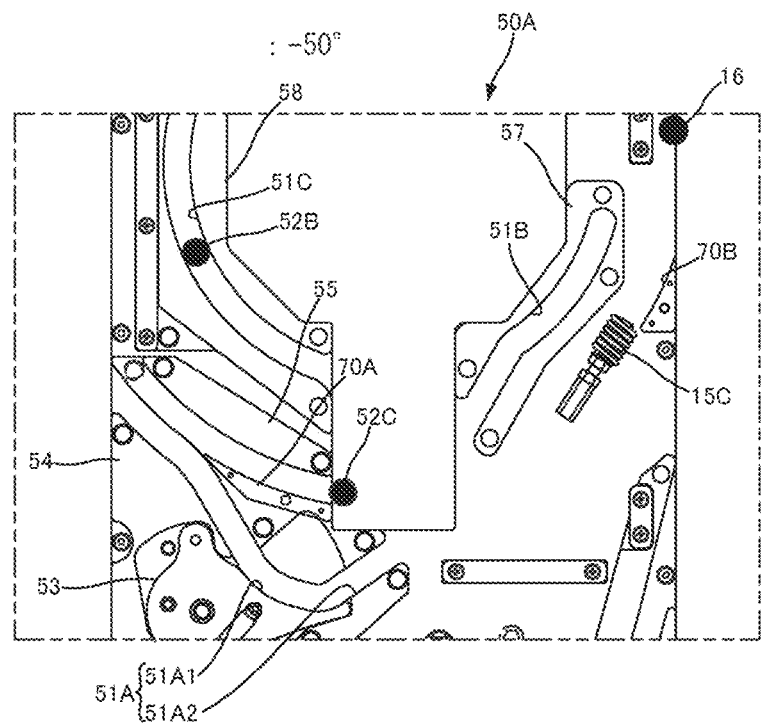
FIG. 15 is an explanatory diagram showing operations of a first-half process at the time of converting a seat from a cross state to a reverse cross state in the interlocking mechanism of the seat device according to the modification of the embodiment.
Figure 15:
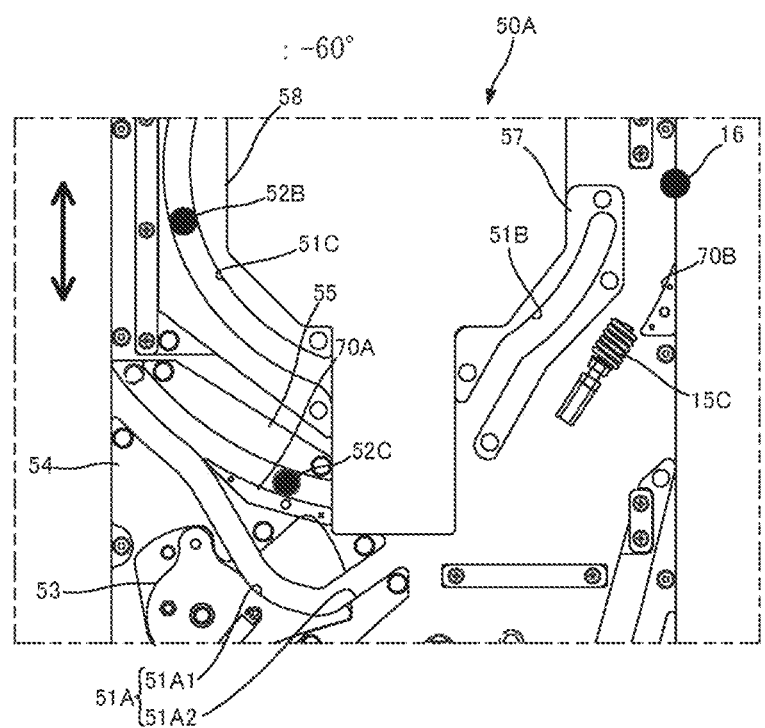
Figure 16:
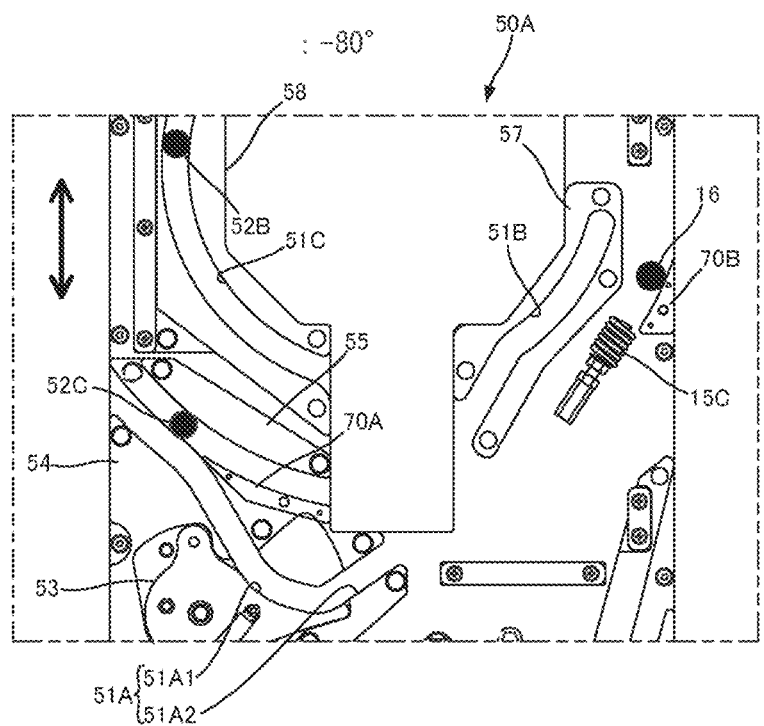
FIG. 16 is an explanatory diagram showing operations of a latter-half process at the time of converting the seat from the cross state to the reverse cross state in the interlocking mechanism of the seat device according to the modification of the embodiment.
Figure 16:
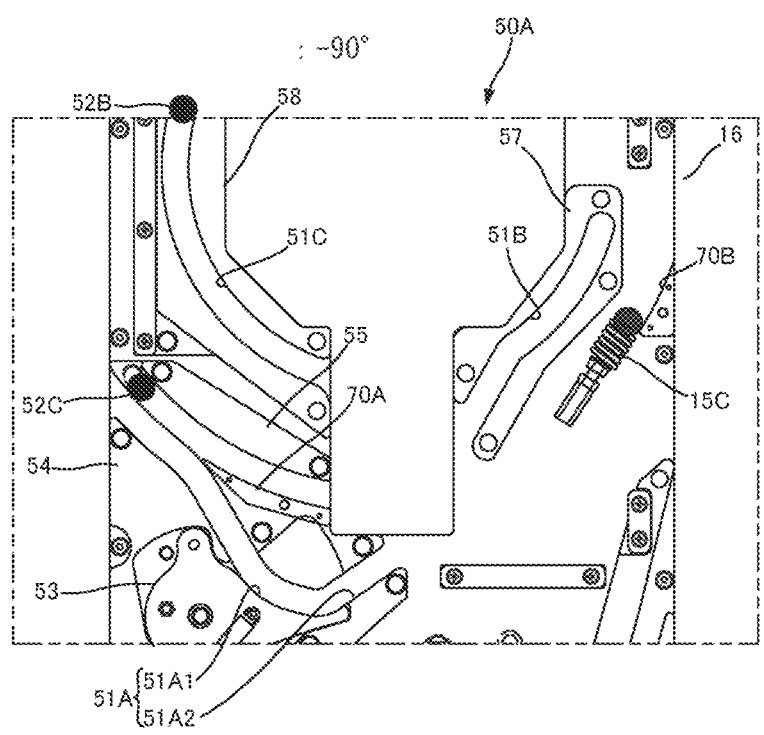

FIG. 14 to FIG. 16 show a modification of the seat device 10 according to the present embodiment.

In the present modification, the interlocking mechanism 50 of the aforementioned seat device 10 is partially improved. That is, in an interlocking mechanism 50A according to the present modification, a regulating member 70 is added, in addition to the cam groove 51 of the interlocking mechanism 50. Note that, in the interlocking mechanism 50A, the same numerals are given to portions similar to those in the interlocking mechanism 50, and a duplicate description is omitted.

In the aforementioned interlocking mechanism 50, when converting the seat from the cross state to the reverse cross state, in a state shown in FIG. 13(*q*) where the rotation angle of the seat is about −70 degrees, there is a possibility that the underframe 30 is retracted to the wall A side (is moved downward in the figure). The reason is that, in the state where the seat is about −70 degrees, only the second rotary member 52B is guided in the third cam groove 51C, and here, since the second rotary member 52B passes the arc-shaped portion extending back and forth of the third cam grooves 51C, there is no means for regulating the retracting movement to the wall A side.

Therefore, in the interlocking mechanism 50A, in addition to the cam groove 51 including the third cam groove 51C, the regulating member 70 is added that regulates the advancement/retraction (particularly, retraction) of the seat, when the seat is reversely rotated without advancement or retraction (from FIG. 12(*n*) to FIG. 13(*r*)) in the process of converting the seat from the cross state (refer to FIG. 11(*i*)) to the reverse cross state (FIG. 13(*r*)). Here, the regulating member 70 is an example of a "regulating portion" of the present invention.

<<Regulating Member 70>>

As shown in FIG. 14, the regulating member 70 consists of, for example, a first regulating member 70A arranged in the vicinity of the first cam groove 51A, and a second regulating member 70B arranged in the vicinity of the second cam groove 51B in the upper surface part 12 of the leg stand 11. Note that, when collectively referring to the first regulating member 70A and the second regulating member 70B, it is merely written as the regulating member 70.

The first regulating member 70A forms a passage between the first regulating member 70A and a guide member 55 arranged to be along the sub channel 51A2 on the guide member 54. Although described later, in the process of the seat being reversely rotated to pass −50 degrees to −70 degrees, the first regulating member 70A is engaged with the third rotary member 52C guided to a passage between the first regulating member 70A and the guide member 55, and regulates the retraction of the underframe 30 with the third rotary member 52C. Here, the third rotary member 52C is an example of an "engagement portion" to which the regulating portion of the present invention is engaged.

The second regulating member 70B forms a passage between the second regulating member 70B and the guide member 57 including the second cam groove 51B. Although described later, in the process of the seat being reversely rotated to pass before −70 degrees to −90 degrees, the second regulating member 70B is engaged with a receiving member 16 of the spring member 15C guided to a passage between the second regulating member 70B and the guide member 57, and regulates the retraction of the underframe 30 with the receiving member 16. Here, the receiving member 16 is an example of "another portion" to which the regulating portion of the present invention is engaged.

<<Operations of Interlocking Mechanism 50A>>

Next, based on FIG. 15 and FIG. 16, a detailed description will be given of the operations of the interlocking mechanism 50A at the time when the seat is reversely rotated without advancement and retraction in the process of the seat being converted from the cross state to the reverse cross state.

As shown in FIG. 15(*a*), when the rotation angle of the seat is −50 degrees, the second rotary member 52B is shortly before the substantially middle of the one end side and the other end side of the third cam groove 51C. At this time, the third rotary member 52C comes to the passage between the first regulating member 70A and the guide member 55. Note that the receiving member 16 is at a position still distant to the second regulating member 70B or the spring member 15C.

As shown in FIG. 15(*b*), when the rotation angle of the seat becomes −60 degrees, the second rotary member 52B is in the vicinity of the substantially middle between the one end side and the other end side of the third cam groove 51C. At this time, the third rotary member 52C is guided to the vicinity of the middle of the passage between the first regulating member 70A and the guide member 55. In such a state, since the third rotary member 52C passes between the first regulating member 70A and the guide member 55, and its movement is limited within the width of the passage, it is possible to regulate the advancement and retraction of the underframe 30 with the third rotary member 52C in arrow directions in the figure.

Subsequently, when the rotation angle of the seat becomes −80 degrees as shown in FIG. 16(*c*) through the state shown in FIG. 14 where the rotation angle of the seat is −70 degrees, the third rotary member 52C has exited from the passage between the first regulating member 70A and the guide member 55. Here, the first regulating member 70A cannot be extended further, since the first regulating member 70A will positionally interfere with the sub channel 51A2 when extended to the other end side (the left side in the figure).

Therefore, instead of the first regulating member 70A, when in this rotation angle, the second regulating member 70B is engaged with the receiving member 16 of the spring member 15C. Accordingly, it is possible to regulate the retraction of the underframe 30 with the receiving member 16 in arrow directions in the figure. Then, as shown in FIG. 16(*d*), when the rotation angle of the seat reaches −90 degrees, i.e., the reverse cross state, a positioning state is achieved where the receiving member 16 is engaged with the spring member 15C.

<Configuration and Effects of Present Invention>

Although the embodiment of the present invention has been described above, the present invention is not limited to the aforementioned embodiment. The present invention derived from the aforementioned embodiment will be described below.

First, in the present invention, the seat device 10 that is convertible in the state of the seat is characterized by comprising the base 11 fixed on the floor surface,
the slider 20 supported by the base 11 so as to be able to advance/retract in front and back directions,
the seat supported by the slider 20 so as to be rotatable in forward and backward directions, and
the interlocking mechanism 50 that interlocks advancement/retraction of the slider 20 with rotation of the seat,
the interlocking mechanism 50 including
the cam path 51 that is provided to one of the base 11 and the seat, and regulates the trajectory of rotation or advancement/retraction of the seat,
the engagement portion 52 that is provided to the other of the base 11 and the seat, and is engaged with the cam path 51 so as to be movable along the cam path 51, the engagement being always maintained to at least any portion of the cam path 51, and
the switching portion 53 that is provided at the branch point in the cam path 51, and can switch the direction to which the engagement portion 52 is guided at the branch point.

According to the seat device 10, the engagement between the cam path 51 and the engagement portion 52 is always maintained on all the trajectories where the state of the seat is converted. Accordingly, it is possible to prevent the seat from derailing from the trajectories, and to positively support the seat.

Moreover, since the cam path 51 is branched, and the switching portion 53 that switches the guiding direction for the engagement portion 52 is provided to the branch point, it becomes possible to use the cam path 51 as the trajectories for separate operations, and it becomes possible to simplify the cam path 51 to save space.

Additionally, the present invention is characterized in that the cam path 51 consists of the plurality of cam grooves 51 arranged around the movement trajectory of the rotation center of the seat, the engagement portion 52 consists of the plurality of rotary members 52 that correspond to and are rotatably engaged with the plurality of cam grooves 51, and in any of the cam grooves 51, from the middle of the main channel 51A1 where the corresponding rotary member 52 converts the seat from one state to the other state, the sub channel 51A2 where the corresponding rotary member 52 converts the seat from the other state to further state is branched, and the switching portion 53 is provided to the branch point.

In this manner, the rotation and advancement/retraction of the seat can be positively interlocked by the cam groove 51 having a simple configuration, and the rotary member 52.

Additionally, the present invention is characterized in that the switching portion 53 includes the mover 530 that switches the direction to which the rotary member 52 is guided at the branch point, and the mover 530 can be displaced between the outbound state where the rotary member 52 is moved from the one end side to the other end side of the main channel 51A1 in one direction, when converting the seat from the one state to the other state with the forward rotation of the seat, and the branch state where the rotary member 52 is guided to the sub channel 51A2 at the branch point in the middle between the other end side and the one end side of the main channel 51A1, when converting the seat from the other state to the further state with the reverse rotation of the seat.

In this manner, by changing the state of displacement of the mover 530 of the switching portion 53 according to separate situations, even with the switching portion 53 having a simple configuration, it becomes possible to achieve various kinds of movement of the rotary member 52 with respect to the main channel 51A1 and the sub channel 51A2.

Additionally, the present invention is characterized in that the mover 530 is set to be normally maintained in the branch state by the biasing force of the biasing means 533, and to be able to be displaced to the outbound state against the biasing force, with passing of the rotary member 52 that has moved from the one end side of the main channel 51A1 in the branch state, and to be able to be temporarily fixed to the outbound state after being operated from the branch state to the outbound state against the biasing force by power, and with passing of the rotary member 52 that has moved from the other end side of the main channel 51A1 in the temporarily fixed outbound state, to be released from the temporarily fixed state to return to the branch state by the biasing force.

In this manner, by combining the displacement of the mover 530 of the switching portion 53 with the biasing force of the biasing means 533, it becomes also possible to achieve more complicated movement of the rotary member 52 with respect to the main channel 51A1 and the sub channel 51A2.

Additionally, the present invention is characterized in that the seat can be converted, by the interlocking mechanism 50, to the long state as the one state where the back of the seat is substantially parallel to and along the wall, the cross state as the other state distant from the wall with the orientation that is substantially orthogonal to the long state, with the forward rotation of the seat from the long state, and the reverse cross state as the further state that is the reverse orientation of the cross state, with the reverse rotation of the seat from the cross state.

Accordingly, the seat device of this invention can be directly applied to general seats mounted in railroad cars.

Additionally, the present invention is characterized in that the interlocking mechanism 50A includes the regulating portion 70 that is provided to one of the base 11 and the seat, in addition to the cam channel 51, and that is engaged with the engagement portion 52 or another portion 16 provided to the other of the base 11 and the seat, and regulates advancement/retraction of the seat, when the seat is reversely rotated without advancement/retraction in the process of the seat being converted from the cross state to the reverse cross state.

Accordingly, when the seat is reversely rotated without advancement/retraction in the process of the seat being converted from the cross state to the reverse cross state, it becomes possible to positively prevent unexpected advancement/retraction. Of course, also when the seat is forwardly rotated without advancement/retraction in the process of the seat being converted from the reverse cross state to the cross state, it becomes possible to positively prevent unexpected advancement/retraction of the seat in a similar manner.

Further, more specifically, the present invention is characterized in that the plurality of cam grooves 51 include at least the first cam groove 51A, the second cam groove 51B, and the third cam groove 51C, the plurality of rotary members 52 include at least the first rotary member 52A corresponding to the first cam groove 51A, and the second rotary member 52B corresponding to the second cam groove 51B and the third cam groove 51C, the switching portion 53 is provided to the branch point in the first cam groove 51A, when converting the seat from the long state to the cross state, in its first-half process, the first cam groove 51A guides the first rotary member 52A to the main channel 51A1, and when converting the seat from the cross state to the reverse cross state, in the middle of the process, the first cam groove 51A guides the first rotary member 52A from the main channel 51A1 to the sub channel 51A2 by the switching portion 53, when converting the seat from the long state to the cross state, in its latter-half process, the second cam groove 51B guides the second rotary member 52B, and when converting the seat from the cross state to the reverse cross state, in its first-half process, the second cam groove 51B guides the second rotary member 52B, and when converting the seat from the cross state to the reverse cross state, in its latter-half process, the third cam groove 51C is provided to guide the second rotary member 52B.

Accordingly, when the seat device of this invention is applied to general seats mounted in railroad cars, it becomes possible to achieve the conversion as easily as possible between the long state, the cross state, and the reverse cross state with minimum required components.

Further, the present invention is characterized in that the plurality of cam grooves 51 further include the fourth cam groove 51D, the plurality of rotary members 52 further include the third rotary member 52C corresponding to the fourth cam groove 51D, and when converting the seat from the long state to the cross state, in its first process, the fourth cam groove 51D is provided to guide the third rotary member 52C, so that the seat is guided to the state where the first rotary member 52A begins to be engaged with the first cam groove 51A.

Accordingly, when converting the seat from the long state to the cross state, it becomes possible to cause the first initial operation to be smoothly performed, without separately utilizing special power. Note that the fourth cam groove 51D and the third rotary member 52C are not essential configurations, when another power is added as mentioned above.

Although the embodiments have been described above with the drawings, the specific configuration is not limited to these embodiments, and even when there are modification and addition in the scope not departing from the gist of the present invention, they are included in the present invention.

For example, the shapes of the leg stand 11, the movable stand 20, and the underframe 30 are not limited to those shown. Additionally, although the example of the seat for two persons has been described, the seat may be for three persons or one person. In addition, the conversion of the state of the seat is not limited to the long state, the cross state, and the reverse cross state.

Additionally, although in the embodiment, while the cam groove 51 is provided to the leg stand 11, the rotary member 52 is provided to the underframe 30, as a reverse aspect, while the rotary member 52 may be provided to the leg stand 11, the cam groove 51 may be provided to the underframe 30.

Further, although in the embodiment, the cam channel is formed by the cam groove 51, and the engagement portion is formed by the rotary member 52, additionally, for example, the cam channel may be formed into a rail shape, and the engagement portion may be formed by a pair of rollers or sliders, etc. that are movably engaged with the rail.

INDUSTRIAL APPLICABILITY

The present invention can be widely utilized as a seat device for chairs for theaters, home, and office, in addition to seats for vehicles installed in cabins of as railroad cars, airplanes, automobiles, marine vessels, etc.

REFERENCE SIGNS LIST

10 . . . seat device
11 . . . leg stand
12 . . . upper surface part
20 . . . movable stand
21 . . . side portion
30 . . . underframe
40 . . . rotation mechanism
41 . . . rotation axis
50 . . . interlocking mechanism
51A . . . first cam groove
51A1 . . . main channel
51A2 . . . sub channel
51B . . . second cam groove
51C . . . third cam groove
51D . . . fourth cam groove
52A . . . first rotary member
52B . . . second rotary member
52C . . . third rotary member
53 . . . switching portion
530 . . . mover
60 . . . rotation lock mechanism
61 . . . lock pin
62a, 62b, 62c . . . locking hole
70A . . . first regulating member
70B . . . second regulating member

What is claimed is:

1. A seat device, comprising:
a base fixed on a floor surface;
a slider supported by the base so as to move in a front direction and a back direction;
a seat supported by the slider so as to rotate in a first direction and a second direction opposite to the first direction; and
an interlocking mechanism that interlocks and moves the slider when the seat is rotated,
wherein the interlocking mechanism includes,
a cam path that is provided to one of the base and the seat to regulate a movement of the seat;
an engagement portion that is provided to the other of the base and the seat to engage with the cam path so as to move along the cam path; and
a switching portion that is provided at a branch point in the cam path to change a direction to which the engagement portion is guided at the branch point.

2. The seat device according to claim 1, wherein the cam path includes a cam groove arranged around a movement trajectory of a rotation center of the seat,
the engagement portion includes a rotary member that rotatably engages with the cam groove, and
the cam groove includes a main channel where the rotary member converts the seat from a first state to a second state and a sub channel branched from the main channel at the branch point where the rotary member converts the seat from the second state to a third state.

3. The seat device according to claim 2, wherein the switching portion includes a mover that switches a direction to which the rotary member is guided at the branch point,
the mover is in an outbound state where the rotary member is moved from one end side to the other end side of the main channel when the seat is rotated in the first direction and is changed from the first state to the second state, and
the mover is in a branch state where the rotary member is guided to the sub channel at the branch point between the other end side and the one end side of the main channel when the seat is rotated in the second direction and is changed from the second state to the third state.

4. The seat device according to claim 3, further comprising a biasing means having a biasing force to push the mover toward the branch state,
wherein the mover is moved to the outbound state against the biasing force when the rotary member is moved from the one end side of the main channel, the mover stays in the outbound state after the mover is moved from the branch state to the outbound state against the biasing force, and the mover is returned to the branch state when the rotary member is moved from the other end side of the main channel.

5. The seat device according to claim 2, wherein the interlocking mechanism converts the seat to a long state as the first state where a back of the seat is substantially parallel to a wall, a cross state as the second state distant from the wall and substantially orthogonal to the long state when the seat is rotated in the first direction from the long state, or a reverse cross state as the third state that is a reverse orientation of the cross state when the seat is rotated in the second direction from the cross state.

6. The seat device according to claim 5, wherein the interlocking mechanism includes a regulating portion that is provided to one of the base and the seat as a separate component from the cam channel, and the regulation portion is engaged with the engagement portion or another portion provided to the other of the base and the seat, and regulates the movement of the seat when the seat is rotated in the second direction and converted from the cross state to the reverse cross state.

\* \* \* \* \*